Patented Dec. 12, 1922.

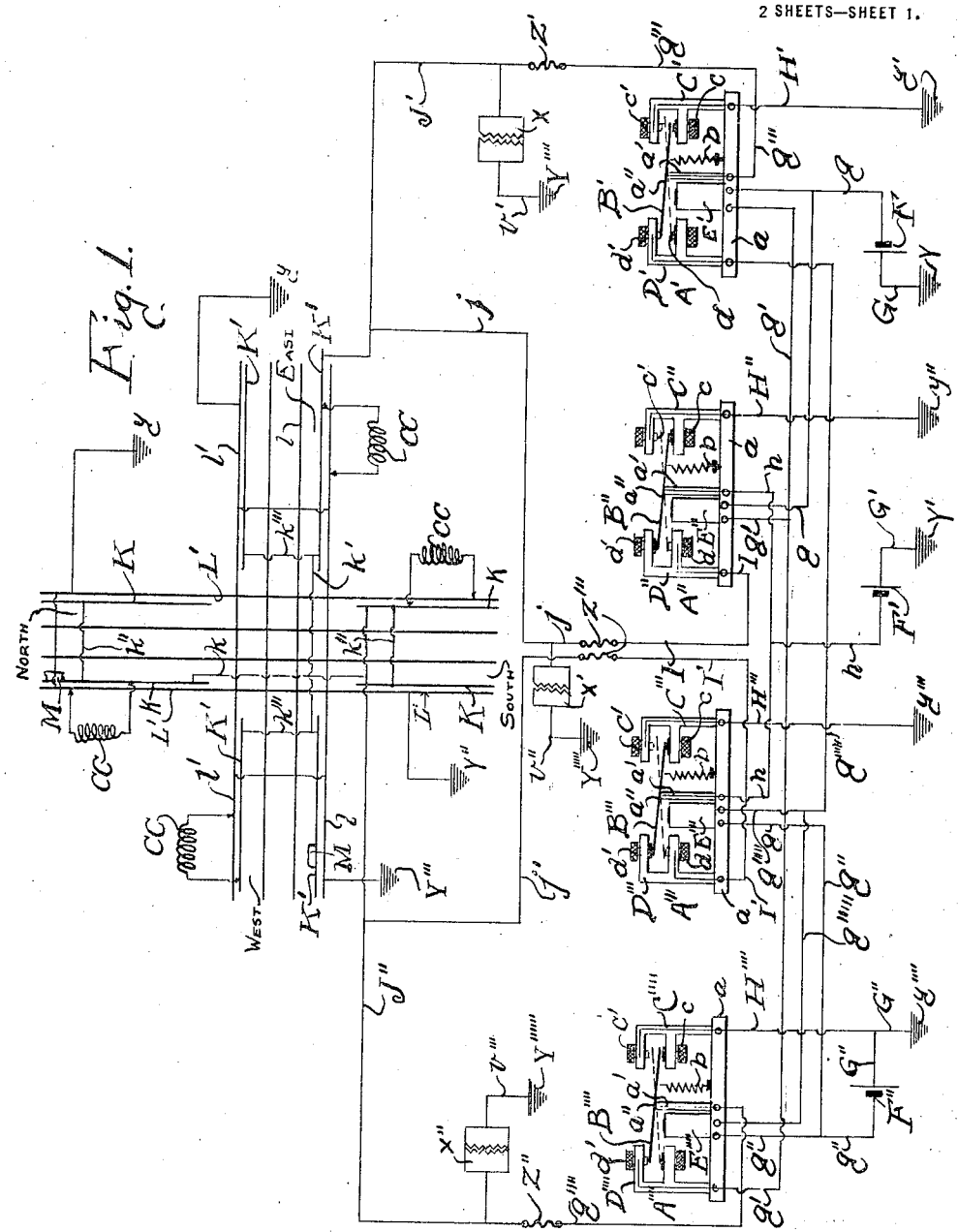

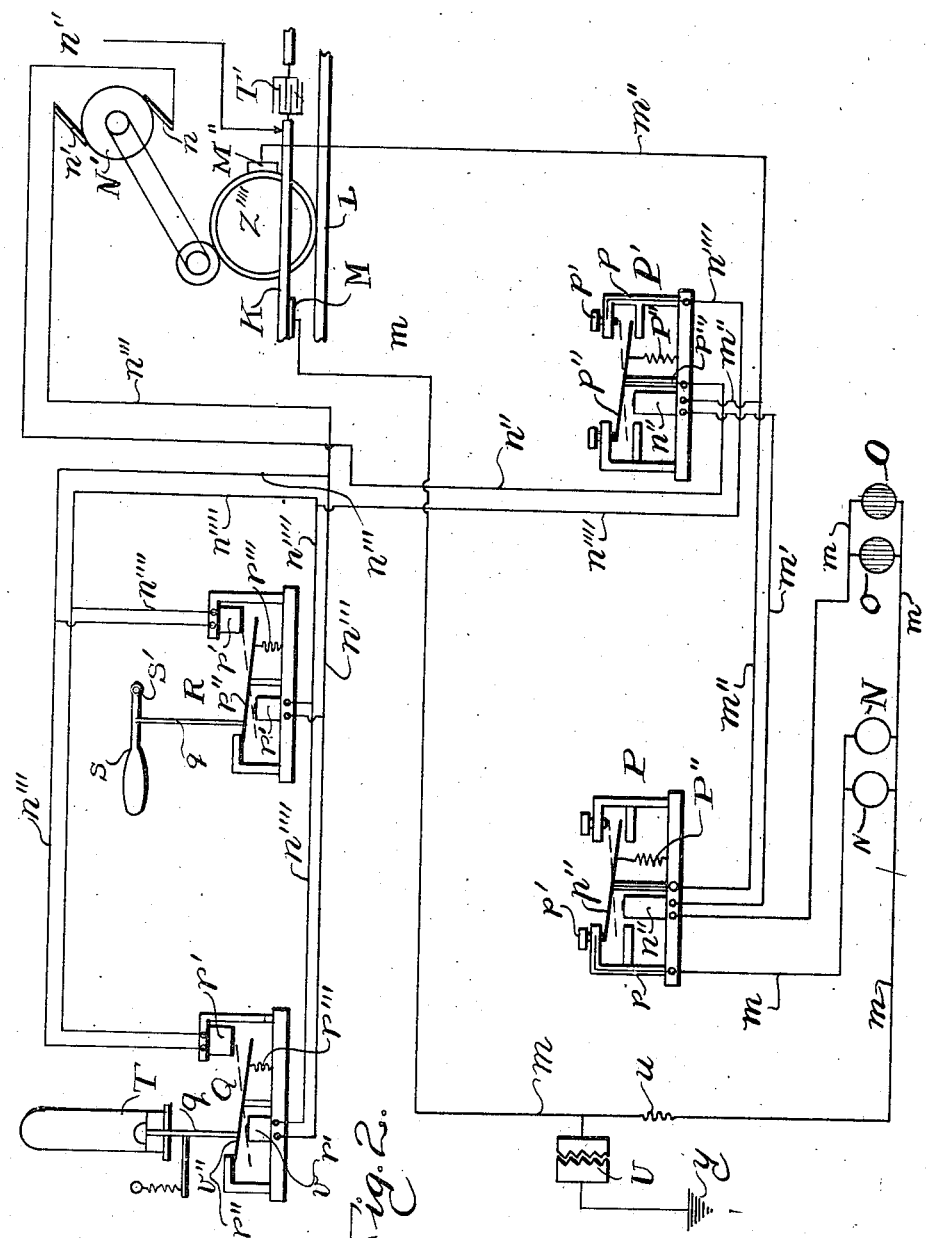

1,438,279

UNITED STATES PATENT OFFICE.

EDWARD H. WERNER, OF CHICAGO, ILLINOIS.

TRAIN-CONTROL APPARATUS.

Application filed May 31, 1921. Serial No. 474,020.

*To all whom it may concern:*

Be it known that I, EDWARD H. WERNER, a citizen of the United States, and a resident of Chicago, in the county of Cook and State of Illinois, have invented certain new and useful Improvements in Train-Control Apparatus, of which the following, reference being had to the drawings accompanying and forming a part hereof, is a specification.

This invention relates to that class of train signal apparatus by means of which signals are displayed in the cab or engine of a railway train, or in a motor of electrically propelled trains, and the person in charge thereof thereby advised of the condition of the track upon which the train is about to travel.

Among the objects of this invention is to obtain an apparatus which is automatic in action; which will display signals indicating that the track is clear or occupied, as the conditions exist; and to obtain an apparatus which will automatically apply brakes to stop the train, in case of it being dangerous to proceed. Additional objects are to obtain an apparatus of the kind named which is certain in operation; economically made and installed, and not liable to get out of order. Additional objects are set forth in the specification and illustrated in the drawings.

In the drawings referred to Fig. 1 is a diagram of an installation of the invention at a railroad crossing.

Fig. 2 is a diagram of the engine or cab carried elements forming a part of the installation.

A reference character applied to designate a given part indicates said part throughout the several figures of the drawings wherever the same appears.

Referring to Fig. 1, X, X', X'', respectively indicate lightning arresters; Y, Y', Y'', Y''', Y'''', Y''''', Y'''''', $y'$, $y''$, $y'''$, and $y''''$ indicate grounds; $y$, $y$, also represent grounds.

A', A'', A''', A'''', respectively indicate relays which are all constructed substantially the same, and for minor parts thereof like characters indicate like parts. They respectively comprise a base $a$, a standard $a'$, which is secured at its lower end to base $a$, and which is provided at its upper end with an axis or pivotal point $a''$. B', B'', B''', B'''', indicate levers of electric conducting material, which are fulcrumed on points $a''$ of the relays A', A'', A''' and A'''', respectively. $b$, $b$, indicate springs, one whereof is attached to each lever of the B series, and at its other end adjustably attached to base $a$. Said springs yieldingly hold said levers in normal position, as is indicated by full lines. C', C'', C''', C'''', and D', D'', D''', D'''', respectively indicate standards, which are rigidly mounted on bases $a$, $a$, of the several relays A', A'', A''', A'''', and are respectively provided with the adjustable contact points $c$, $c'$, $d$, $d'$.

In relays A', A'''', the contact points $c$ and $d$ are insulated, and in relays A'', A''', the contact points $c$ and $d'$ are insulated.

E', E'', E''', E'''', indicate electromagnets. F, F', F'' indicate batteries. The voltage of battery F' is considerably higher than is the voltage of batteries F, F'', for reasons hereinafter set forth. G, G', G'' indicate conductors from batteries F, F', F'', respectively, to grounds Y, Y', $y''''$, and $g$, $g''$ indicate conductors from batteries F, F'', respectively, which are branched and extend to the coils of electromagnets E', E'', of relays A', A'', to the coils of electromagnets E''', E'''', of relays A''', A'''', and are connected thereto, and from said coils of electromagnets E', E'', conductors $g'$, $g'$, extend and are connected to contact point $d'$ of relay A'''', and from the coils of electromagnets E''', E'''', of relays A''', A'''', conductors $g'''''$ extend and are connected to contact point $d'$ of relay A'. $g'''$, $g''''$, indicate conductors which are connected to axial points $a''$, $a''$, of standards $a'$, $a'$, of relays A', A'''', respectively, and extend to fuses Z', Z''', respectively. $h$ indicates a conductor from battery F', which is branched to extend to axial points $a''$, $a''$, of relays A'', A'''. H', H'', H''', H'''', respectively indicate conductors which are connected to contact points $c'$, $c'$, of relays A', A'', A''', A'''', and extend therefrom to grounds $y'$, $y''$, $y'''$, $y''''$. I indicates a conductor which connects with contact point $d$ of relay A'', and extends to fuse Z'''. I' is a conductor which extends from contact point $d$ of relay A''' to an additional fuse Z'''. J' indicates a conductor which is connected to and extends from fuse Z' to special rail K', and J'' indicates a like conductor from fuse Z'' to special rail K. $j$, indicates a conductor which is connected to and extends from fuse Z''' to conductors J′, and j′ indicates a conductor from the additional fuse Z‴ to conductor J″. Conductor j is also branched to extend to lightning arrester X′. v′, v″, v‴ indicate conductors from lightning arresters X, X′, X″, respectively, to grounds Y″″, Y″″′, Y″″″.

The special rails K, K, of the south bound tracks L′, L′, on opposite sides of the crossing indicated, are connected by conductors, k, k″ and the special rails K′, K′ of the east bound tracks, l, l, on opposite sides of the crossing, are connected by conductors k′, k‴; and the special rails of the east and west bound tracks are connected by conductors k‴, k‴, and those of the north and south bound tracks by conductors k″, k″.

Referring to Fig. 1, the movable conductors B′, B″, B‴, B″″ are adjusted so that during the working of said relays they do not come in electrical contact with contact points c′, c′, c′, c′, to ground said movable conductors; while, at the same time, they are so close to contact as to act as lightning arresters.

CC, Fig. 1, indicate the car carried members of the circuits which are closed when the brush M is in contact with the special rails K, K′, respectively.

Referring to Fig. 2, M indicates the special brush which is mounted on the cab or motor adapted to co-act with the track-side installation indicated in Fig. 1, and arranged to contact with one of the special rails K, K, K′, K′. m indicates a conductor from brush M to signals N and O, and from signal N to standard p of relay P. p′ indicates a contact point in electrical connection with standard p, and p″ a pivotally mounted conductor normally in electrical contact with contact point p′, being yieldingly there held by spring P″. m‴ indicates a conductor in electrical connection with pivotally mounted conductor p″, and with terminal M″ and is branched to coil n″ of P′. Terminal M″ is in electrical connection with wheel Z″″ of the engine or motor, and said wheel is a conductor to rails L, L, l, l, on whichever one of said rails said wheel is travelling.

The conductor m is branched at signals N and O, (said signals being indicated as electric lamps of different voltage), to extend to contact point p′ of relay P and to the coil n″ of said relay. m′ indicates a conductor from relay coil n″ of relay P to the coil n″ of relay P′. m″ indicates a conductor from movable conductor p″ of relay P, to terminal M″, being branched to extend to coil n″ of relay P′.

N′ indicates a cab carried electrical generator. An electrical generator is preferably used, and n, n′ indicate the collecting brushes of said generator. n″ indicates a conductor connected to brush n and extending to standard p‴ and the axial point of movable conductor p″, of relay P′. n‴ indicates a conductor which extends from brush n′ to coils r′, r′ of relay R, and is branched to extend also to said coils r′, r′ of relays Q and R, said branching putting said coils in multiple; and n″″ indicate conductors from said coils r′, r′, r′, r′ to standard p of relay P′.

S indicates a lever arranged to control the valve S′, of the train pipe of the air brake system of the train on which the cab carried members of the apparatus is installed.

T indicates a signal, and T′ a condenser.

Relays Q and R respectively, are provided with pivoted levers r″, r″, which respectively form the armatures of electromagnets provided with coils r′, r′. r‴ indicates spring which yieldingly holds levers r″, r″ in the position indicated by full lines in Fig. 2. When the coils r′, r′, r′, r′, of the electromagnets of relays Q, R, are sufficiently energized the levers r″, r″ are moved into the position indicated by broken lines, against the resiliency of springs r‴, r‴, thus actuating the lever S and sounding the signal T, by means of the connections q, q, respectively.

Assuming, with the hereinbefore recited installations made, that a train approaches a crossing from north or south, the following circuit, called by me the free circuit as it indicates by the signals given that the crossing is free, is closed, when brush M comes in contact with special rail K. From battery F on the right hand side of Fig. 1, on conductor g to the coils E′, E″, of relays A′, A″, on conductor g′, which is branched from the coils of electromagnets E′, E″, to standard D″″ of relay A″″, to contact point d′ of said relay A″″, on conductor B″″ to pivotal point a″ on standard a′, conductor g″″ to and through fuse Z‴, on conductor J″ to special rail K, conductor k to special rail K on the opposite side of the crossing to brush M, conductor m (see Fig. 2) to and through fuse u and to lamps N and O, there dividing: through lamps N and again on conductor m to standard p and contact point p′ of relay P, on movable conductor p″ to and on conductor m″ to terminal M″, and wheel Z″″ to the rail and ground; thence to ground X and on conductor G back to said battery F. From the point of division of said circuit the elements are, lamps O, conductor m from said lamps to coil n″ of relay P, conductor m′ to and through coil n″ of relay P′ to terminal M″, and from thence as above traced. By the closing of the above circuits the movable conductors B′, B″, of relays A′ A″ are pulled down, being armatures to coils E′, E″, and said coils being energized, thereby interrupting a corresponding circuit of the east and west tracks which is hereinafter traced, at contact point $d'$, of said relay $A'$. The movable conductor $B''$ of relay $A''$ is turned on its pivotal point $a''$ thereby moving it from contact point $d'$ to contact point $d$, and closing a circuit through the trackside installation for lamps O, of the circuit which includes battery $F'$ and which I term the blocking circuit, at standard $D''$ of said relay $A''$ for east and west moving trains.

This circuit proceeds, from battery $F'$, on conductor $h$, central standard $a'$ of relay $A''$, pivotal point $a''$ of said standard, movable member $B''$, contact point $d$, standard $D''$, conductor I, fuse $Z'''$, conductor $j$, special rail $K'$, and thence to and through the cab carried installation of an east or west bound train when the brush M thereof is in electrical contact with said special rail, for instance from brush M on conductor $m$ to coil $n''$ of relay P, (said circuit dividing at signals N, O, the circuit extending from signal N to contact point $p'$ and movable member $p''$ being immediately broken by the energizing of the electromagnet $n''$), conductor $m'$ to coil $n''$ of relay $P'$, conductor $m''$ to terminal $M''$, wheel $Z''''$ to rail $l$ and ground $Y'$.

By the closing of the above traced free circuit the lamps N, N, on said north or south bound trains are made to glow, on account of the voltage of the lamps N, N, corresponding in voltage with said battery F, but the lamps O, O, of the blocking circuit will not be lighted, on account of the higher voltage required by them.

It will be observed that the current passing from battery F through the lamps O, O, and coils $n''$, $n''$ of relays P, $P'$, is not sufficient to so energize said coils as to pull down the movable levers $p''$, $p'''$, and so break the free line circuit for north and south bound trains, springs $P''$, $P'''$ being adjusted so as to be sufficiently strong to maintain said movable levers in the position indicated by full lines, as against said energizing of coils $n''$, $n''$.

Assume the crossing to be clear and an east or west bound train approaching it. Upon the brush M striking special rail $K'$, a circuit is closed which, starting from battery $F''$ at the left hand side of Fig. 1, as viewed, includes conductor $g''$, to and through the coils $E''''$, $E'''$, of relays $A''''$, $A'''$, at said left hand side, conductor $g''''$, standard $D'$, contact point $d'$ and movable conductor $B'$ of relay $A'$ at the right hand side of said Fig. 1, axis $a''$ and standard $a'$ of said relay, conductor $g'''$ to and through fuse $Z'$, conductor J to special rail $K'$. The cab carried elements of this circuit are the same as of the last traced circuit, and the lamps N, N, will glow.

Assuming the above named conditions relative to the north and south bound trains and circuits exist, a free line indication being shown in the cab or engine, of said north or south bound train, and an east or west bound train approaches the crossing. In such case the blocking circuit, in which the lamps O, O, (red lamps) are elements, (of said east or west bound trains) will be closed and energized by the brush M on said trains coming in contact with the special rail $K'$. Said blocking circuit comprises, starting from battery $F'$, the following elements; conductor $h$ being branched to standards $a'$, $a'$, of relays $A''$, $A'''$ to pivotal points or axes $a''$ of said relays, movable conductors $B''$, $B'''$ contact points $d$ and standards $D''$, $D'''$ of said relays, conductor I to and through fuse $Z'''$, conductor $j$ to special rail $K'$, and on said rail to brush M (see Fig. 2), thence on conductor $m$ to and through the fuse $u$ to lamps N, O, through lamps O, to the coil $n''$ of the electromagnet of relay P and the coil $n''$ of relay $P'$, conductor $m''$ to terminal $M''$, wheel $Z''''$ to ground and thence to ground $Y'$ of said battery $F'$, and thence on conductor $G'$ back to the battery $F'$. The lamps N, N, are not energized as the electromagnet $n''$ of relay P is energized to draw movable conductor $p''$ of said relay down into the position indicated by broken lines, thus breaking the circuit in which said lamps N, N are elements. At the same time the electromagnets provided with coils $n''$ (of relay $P'$) are energized, and draw movable conductor $p''$ of said relay down to cause the other end of said conductor to come into electrical contact with contact point $p'$ of said relay, thus closing the local cab or engine carried circuit which is energized by generator $N'$, (or by a storage battery substituted therefore, if preferred); and the closing of this circuit in which the several coils $r'$, $r'$, $r'$, $r'$ are elements, energizes said coils and moves the movable members $r''$, $r''$, from the position in which they are indicated by full lines in Fig. 2, into the position indicated by broken lines, thereby applying brakes and actuating signal T. This circuit is termed by me the brake and alarm circuit and it includes the following elements; starting from brush $n$, conductor $n''$, standard $p'''$ and movable conductor $p''$ and contact point $p'$ of relay $P'$, conductor $n''''$ to coils $r'$, $r'$, $r'$, $r'$, of relays Q and R, and conductor $n'''$ to brush $n'$.

Assuming the above recited conditions relative to the east and west bound tracks to exist, namely, a train being on said crossing and traveling east or west, and that a north or south bound train approaches said crossing, a blocking circuit will be established comprising the same elements in the cab or engine of said north or south bound train as is last above set forth as formed in an east or west bound, and comprising also the following elements of the trackside installation, to wit; starting from battery F', on conductor $h$ to standard $a'$, pivotal point $a''$ of relay A'', movable conductor B'', contact point $d$ of relay A'' and standard D'' conductor I to and through fuse Z''', conductor $j$ to conductor J'' and to north and south special rail K, thence on brush M through the car or engine carried elements, as before, to ground, to ground Y', and thence on conductor G' back to said battery.

Where rails K, and K', extend for any considerable distance along the track way, it is divided into blocks, the rails in each block being insulated, but connected by condensers T'. When thus arranged said special rails make a continuous conductor for inductive currents whether the same be used for telegraphy or telephony, while a direct current from the track side batteries cannot pass from one insulated rail section to another. The track side installation for each and every section of the special rail is a duplicate of the track side installation illustrated in Fig. 1, and hereinbefore described.

I claim:

1. Signal means comprising insulated track side special rails and cab carried electric conductors arranged to co-act with said special rails, a cab carried electrical generator, cab carried relays and cab carried additional relays, conductors from said generator to the armature of one of said first-named relays and from a contact point on said last named relay to the coils of the electromagnets on said additional relays, said armature normally not in electrical contact with said contact point, and said last named conductor branched to place said additional relays and both the coils of each thereof in multiple, conductors extending from said coils to said generator, signals and connections from said signals to the armatures of said additional relays, in combination with track side installations comprising said special rail, relays, a conductor from said special rail to the armature of one of said relays and from a contact point on said last named relay with which said armature is normally in electric contact to the coils of the electromagnets of a plurality of relays, said conductor being branched to place said coils in multiple, a conductor from said coils to a battery and from said battery to ground, said last named relays arranged to form elements in an additional track side installation of signal circuits comprising additional track side insulated special rails, and additional cab carried installations.

2. Signal means comprising insulated track side special rails and cab carried brush conductors arranged to co-act with said special rails, a cab carried electrical generator, cab carried relays and additional cab carried relays, conductors from said generator to the armature of one of said first named relays and from a contact point of said relay with which said armature is normally not in electrical contact to the coils of said additional relays, said last named conductor being branched to place said additional relays in multiple, and extending from said coils to said generator, signals and connections from said signals to the armatures of said additional relays, in combination with track side installations comprising said special rails, relays, a conductor from said special rails to the armature of one of said last named relays and from a contact point on said last named relay with which said armature is normally in electrical contact to the coils of the electromagnets of a plurality of additional relays, said last named conductor being branched to place said coils in multiple, a conductor from said coils to a battery and from said battery to ground, said last named relays arranged to form elements in an additional track side installation of signal circuits comprising additional insulated track side special rails and additional cab carried installations.

3. An insulated track side special rail, a cab carried conductor arranged to co-act with said rail, signals, one thereof energizable by a current of substantially lower potential than is required to energize the other, a relay comprising an electromagnet and a movable member arranged to co-act therewith, conductors from said co-acting conductor to said signals, from said signal of lower potential to said movable member and from said movable member to a terminal in contact with a wheel of said cab, and a conductor from said signal of higher potential to the coil of said electromagnet, from said coil to and through the coil of an additional relay and to said conductor which is extended to said terminal, all combined and arranged so that when said signal of higher potential is energized the circuit in which said signal of lower potential is an element is broken by the energizing of the coil and the resulting movement of said co-acting movable member of said first-named relay.

4. An insulated track side special rail, a cab carried conductor arranged to co-act with said rail, signals, one thereof energizable by a current of substantially lower potential than is required to energize the other, a relay comprising an electromagnet and a movable member arranged to co-act therewith, conductors from said co-acting conductor to said signals, from said signal of lower potential to said movable member and from said movable member to a terminal in contact with a wheel of said cab, and a conductor from said signal of higher potential to the coil of said electromagnet, an additional relay comprising an electromagnet and an additional movable member arranged to co-act therewith, and a contact point with which said additional movable member is normally not in electrical contact, a conductor from said first named coil to the coil of said additional relay and from said coil to said conductor which extends to said terminal, in combination with a local cab carried circuit comprising additional signal members, additional relays, an electric generator, said additional movable member and said contact point and additional conductors, all arranged so that when said signal of higher potential is energized the circuit in which said signal of lower potential is an element is broken by the energizing of the coil and the resulting movement of its co-acting member of said first named relay, and said local circuit is closed by the movement of the additional co-acting movable member of said additional relay by the energizing of its electromagnet.

5. Track side installations to crossing tracks comprising an insulated track side special rail to each of said tracks, a plurality of batteries of substantially different potential, relays respectively comprising an electromagnet, a plurality of contact points and a movable member arranged to co-act with said electromagnet and with said contact points and to be normally in electrical contact with one thereof, additional relays respectively comprising an electromagnet, a contact point and a movable member which is normally not in contact with said contact point, in combination with conductors from the special rails to the movable members of the first named relays, conductors from the contact points with which said movable members are normally in contact to the coil of the electromagnet of one of said additional relays, said last named conductors being branched to the coils of the other one of said first named relays, conductors from said coils and additional coils to the battery of lower potential and to ground, and conductors from said special rails to the contact points of said additional relays, and from the movable members of said additional relays to said battery of higher potential and to ground.

EDWARD H. WERNER.

Witnesses:
CHARLES TURNER BROWN,
STANLEY J. HOPEITER.